(No Model.)
B. SCHAPKER.
FEATHER RENOVATOR.
No. 305,339. Patented Sept. 16, 1884.
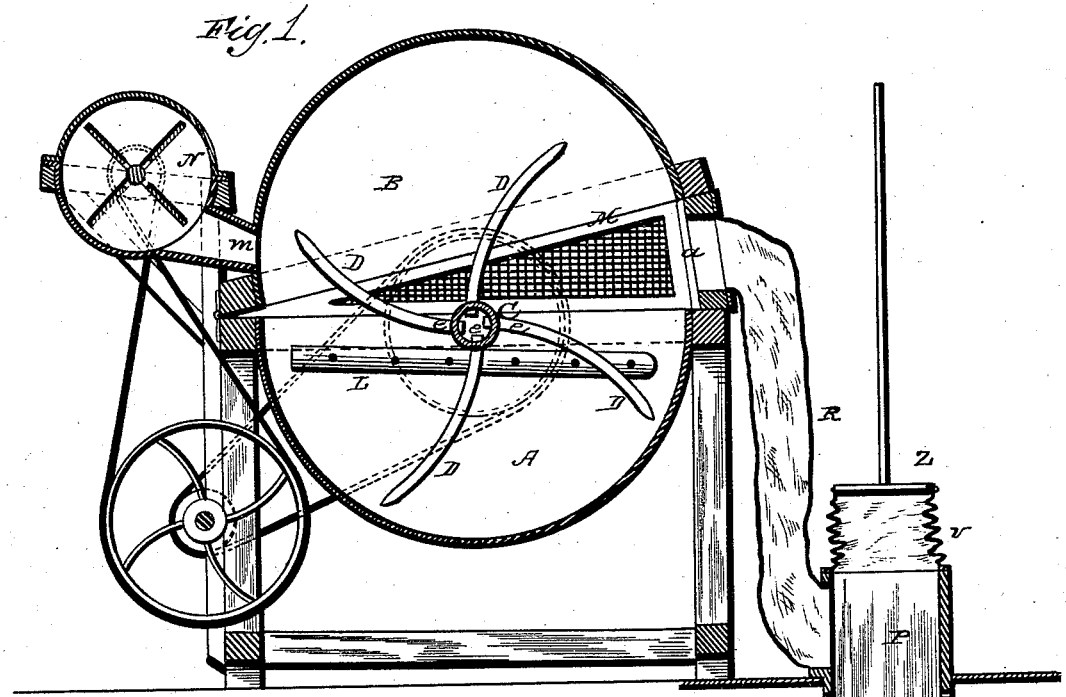
Fig. 1.
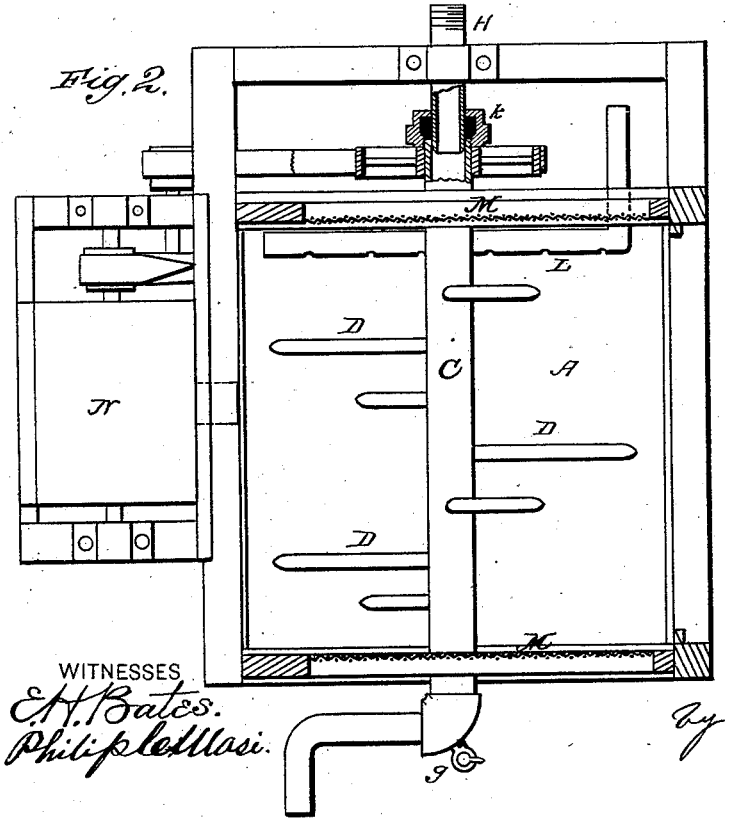
Fig. 2.
WITNESSES
INVENTOR
Bernard Schapker
by Anderson & Smith
his ATTORNEYS

UNITED STATES PATENT OFFICE.

BERNARD SCHAPKER, OF EVANSVILLE, INDIANA, ASSIGNOR OF ONE-HALF TO SAUNDERS B. SANSOM, OF SAME PLACE.

FEATHER-RENOVATOR.

SPECIFICATION forming part of Letters Patent No. 305,339, dated September 16, 1884.

Application filed March 14, 1883. Renewed December 26, 1883. (No model.)

*To all whom it may concern:*

Be it known that I, BERNARD SCHAPKER, a citizen of the United States, residing at Evansville, in the county of Vanderburg and State of Indiana, have invented certain new and useful Improvements in Feather-Renovators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a vertical sectional view of my machine, and Fig. 2 is a horizontal sectional view of the same.

This invention has relation to devices for renovating feathers; and it consists, first, in the construction and novel arrangement, in connection with a holding-cylinder, of a hollow rotary shaft carrying hollow fingers having their outer ends closed and their inner ends projecting into the bore of the hollow shaft; secondly, in providing the shaft with a drain-faucet at its ends; thirdly, in the combination, with the cylinder and its rotary hollow shaft and fingers, of a perforated pipe within the cylinder and connected to the steam-supply; fourthly, in the combination, with the cylinder and its rotary hollow shaft and fingers, of a blower-fan opposite the cylinder-discharge; fifthly, in the construction and novel arrangement of the packing-box and the follower connected by flexible material to said packing-box; sixthly, in the removable wire-cloth separators adapted to be connected to the cylinder; and, finally, in the combination, with the cylinder and separators, of the rotary shaft and its fingers, the blower, the packing device, and the tube leading from the latter to the cylinder-discharge, all as hereinafter set forth.

In the accompanying drawings, the letter A designates a cylindrical receptacle for the feathers. This receptacle or case is made in two sections, the lower section being supported on a suitable base, and the upper section or cover, B, being hinged or otherwise connected thereto.

C represents the hollow rotary shaft, which extends through the case A, and is provided with hollow fingers D, the outer ends of which are closed. The inner ends, *e*, of these fingers project into the chamber or bore of the hollow shaft to facilitate the drainage, the water of condensation being removed through a stop-cock, *g*.

H represents the steam-supply pipe for the shaft C, and *k* the stuffing-box, forming a tight joint.

L indicates a perforated pipe within the case A, which is also connected with the steam-supply in any suitable manner.

M designates a wire-cloth grating or separator, arranged near the ends of the case A, and usually made removable. It is designed to assist in separating the dust from the feathers.

N represents a blower, whereof the discharge-mouth *m* is opposite the main discharge of the case at *a*.

P indicates a packing-box, which is usually arranged in the floor of a building, so that a sack, *s*, can be attached to its lower end. A tube, R, connects the box to the discharge of the case A, and Z represents a follower or packer, which is connected to the upper end of the box or packing-tube P by means of cloth or other flexible material, as at *v*.

The machine is designed to be operated by hand or power, and is geared with pulleys and belting, as indicated in the drawings; or other common devices for rotating the shaft and fan may be employed.

The feathers, having been placed in the case A, are subjected to the direct action of the steam, which issues in jets from the perforated pipe, and at the same time the curved fingers of the rotary shaft move the feathers about in such a way as to provide access to the steam throughout the mass. When the cleansing action of the steam is completed, it is cut off from the perforated pipe. The steam, however, enters the hollow shaft and its curved fingers, which continue to rotate in the mass, gradually drying the same. This operation is assisted by means of the blower, which also, through the medium of the wire separators, serves to cool and make the feathers fresh. When the feathers are thoroughly dried, they are removed through the tubular connection from the main case to the packing-box, being forced out of the main case by the operation of the fan and the rotating shaft and fingers. As the feathers are received in the packing-box, they are packed by the follower closely into the sack, the webbing or connection between the follower and box preventing the feathers from flying, and holding them until they are pressed into the sack.

Having thus described this invention, what I claim, and desire to secure by Letters Patent, is—

1. In a feather-renovator, the combination, with the cylinder and its separator, of the hollow rotary shaft and its fingers, the blower, the packing device, and the tube leading from the latter to the cylinder-discharge, substantially as specified.

2. In a feather-renovator, the packing-box having its follower connected to its upper end by flexible material, and provided with a lateral tube leading to the cylinder-case, substantially as specified.

In testimony whereof I affix my signature in presence of two witnesses.

BERNARD SCHAPKER.

Witnesses:
GUY W. ASHLEY,
JAMES N. VICKERY.